(12) United States Patent
Bartlett

(10) Patent No.: US 6,923,226 B2
(45) Date of Patent: Aug. 2, 2005

(54) DEVICE FOR PREVENTING ENTRY OF AN UNLEADED GAS FILL NOZZLE IN A DIESEL FUEL FILLER NECK

(76) Inventor: Patrick Wesley Bartlett, 8368 Parkwood Blvd., Seminole, FL (US) 33777

( * ) Notice: Subject to any disclaimer, the term of this patent is extended or adjusted under 35 U.S.C. 154(b) by 29 days.

(21) Appl. No.: 10/611,691

(22) Filed: Jul. 1, 2003

(65) Prior Publication Data
US 2005/0000592 A1 Jan. 6, 2005

(51) Int. Cl.[7] .................................................. B65B 1/04
(52) U.S. Cl. ................... 141/390; 141/286; 141/311 R; 220/86.2
(58) Field of Search ............................. 141/286, 311 R, 141/367, 390; 220/86.2

(56) References Cited

U.S. PATENT DOCUMENTS

| | | |
|---|---|---|
| 3,730,216 A | 5/1973 | Arnett et al. |
| 3,880,214 A | 4/1975 | Slavin |
| 3,911,977 A | 10/1975 | Berger |
| 3,942,564 A | 3/1976 | Nakazato |
| 4,679,698 A | 7/1987 | Thorn et al. |
| D392,020 S | 3/1998 | Fairles |
| 6,302,169 B1 | 10/2001 | Pulos |
| 6,382,270 B1 * | 5/2002 | Gzik ........................... 141/94 |
| 6,666,239 B2 * | 12/2003 | Buchgraber et al. ........ 141/286 |

* cited by examiner

Primary Examiner—J. Casimer Jacyna
(74) Attorney, Agent, or Firm—Dennis G. La Pointe

(57) ABSTRACT

A device for preventing entry of an unleaded gas fill nozzle in a diesel fuel filler neck comprising an elongate sleeve configured to be inserted inside the diesel fuel filler neck. The sleeve provides for a finger tight or friction pressure fit at its upper end against the internal wall surface of the diesel fuel filler neck. A gas nozzle blocking screen or grid for preventing the insertion of an unleaded gas fill nozzle into the sleeve is located at or near the upper end of the sleeve. The invention also includes a filler neck cap. The filler neck cap includes a removable weather-tight cap through which the nozzle is inserted. The cap preferably includes a key lock to prevent its removal by anyone other than an authorized person. The removable weather tight cap preferably is tethered to the filler neck cap.

20 Claims, 7 Drawing Sheets

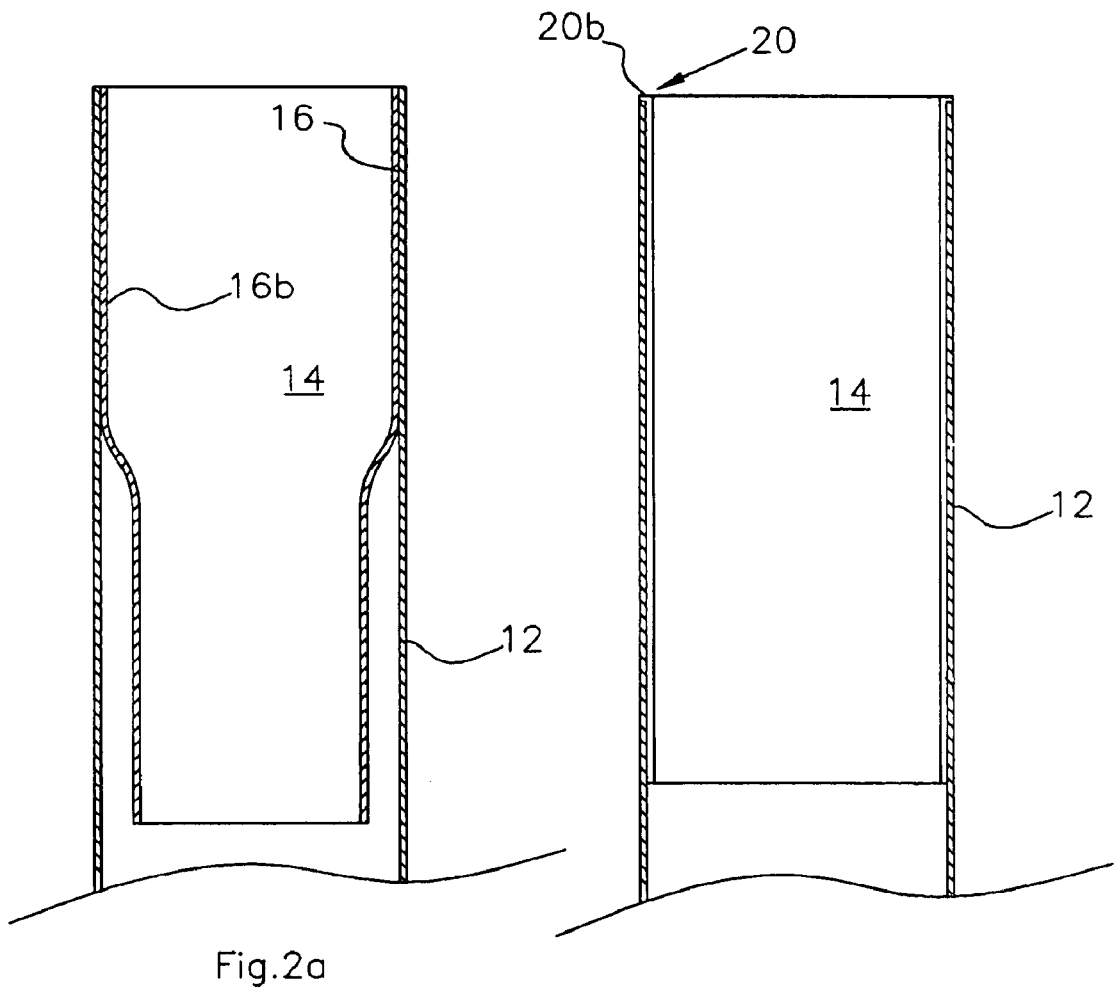

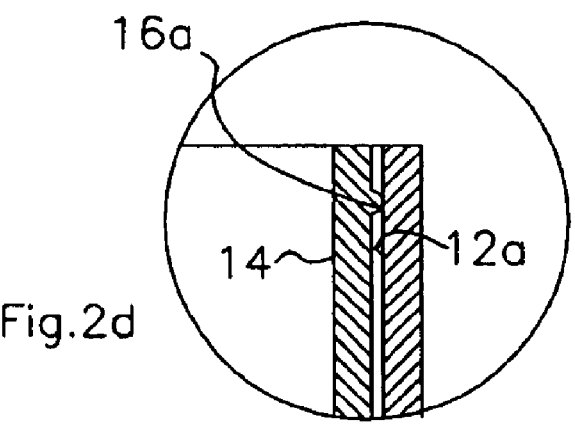
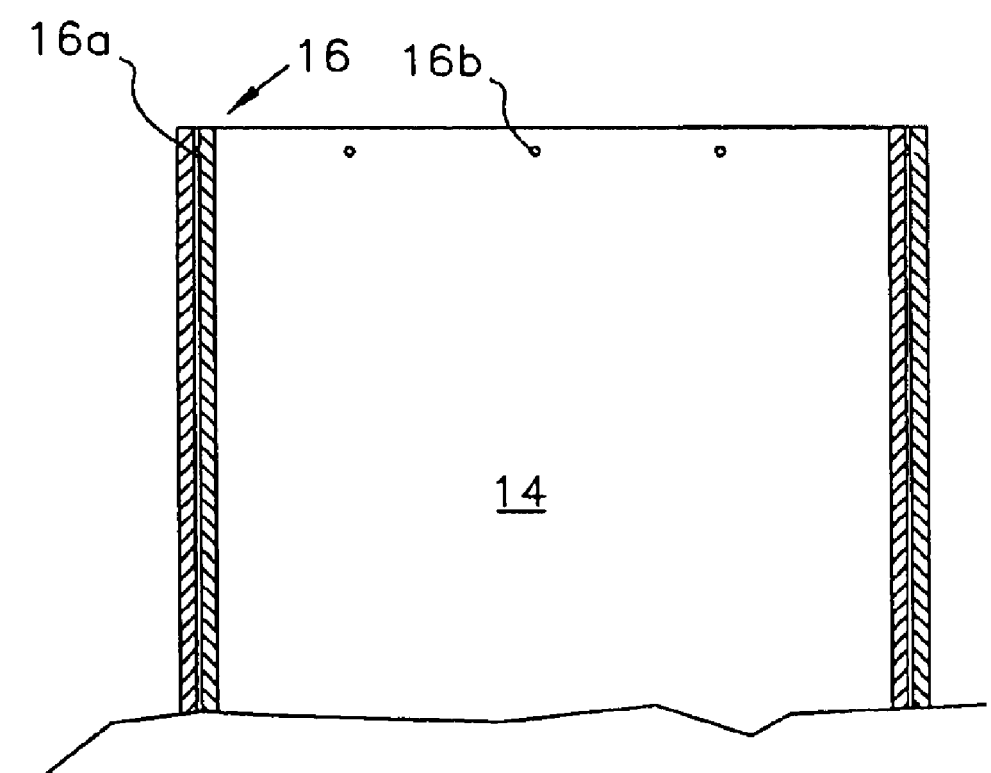

DEVICE FOR PREVENTING ENTRY OF AN UNLEADED GAS FILL NOZZLE IN A DIESEL FUEL FILLER NECK

The invention relates to a restrictor in a diesel fuel filler neck that prevents the entry of an unleaded gas fill nozzle, thereby preventing the inadvertent cross-contamination of diesel fuel and unleaded gas in a vehicle tank intended to contain diesel fuel only.

It is not uncommon for a truck driver or any motor vehicle operator who is used to using unleaded gas to forget when temporarily using a diesel fuel operated vehicle that only diesel fuel can be added to the vehicle gas tank. In some cases, the driver is simply not being cognizant of the warning sign "Diesel Fuel Only." As a result, cross-contamination of the gas takes place and costly engine damage results. If the vehicle is part of a fleet of vehicles used for public ground transportation or as a rental truck such as those from U-HAUL and RYDER, revenues are lost due to the down time of the vehicle while it is being repaired. Further, cross-contaminated fuel is considered hazardous waste and must be properly disposed under the Resource Conservation and Recovery Act.

Others have tried to design restrictors or guards to solve this problem. For example, the diesel fuel nozzle restrictor disclosed in U.S. Pat. No. 6,302,169 to Pulos is a device with a hinged cap or cover at its lowest end. The smaller unleaded gas fill nozzle will not simultaneously push out the release arms to release the cover or cap; however, the device is designed such that the larger diameter diesel fuel fill nozzle will slide along the wall of its sleeve and push the release arm(s) out. However, it is clear that over time, the cap or cover may not come back up sufficiently to be locked by the lip at the end of the release arms. If this happens, unleaded gas can still be added to the diesel fuel.

What is needed is a device that is not dependent on internal working mechanisms such as the release arms of Pulos, and prevents the entry of the smaller unleaded gas fill nozzle into the filler neck of a diesel fuel operated vehicle.

SUMMARY OF THE INVENTION

The invention, which is described herein in more detail in reference to drawings included within this disclosure, is a device for preventing entry of an unleaded gas fill nozzle in a diesel fuel filler neck. It includes an elongate sleeve having an upper end and a lower end and configured to be inserted inside the diesel fuel filler neck. The sleeve has means near its upper end for providing a snug or friction pressure fit against the upper end of the internal wall surface of the diesel fuel filler neck when the sleeve is pushed into diesel fuel filler neck.

The invention also includes unleaded gas nozzle blocking means for preventing the insertion of an unleaded gas fill nozzle into the sleeve.

The upper end of the sleeve may further include stop means for preventing the insertion of the upper end of the sleeve beyond the top edge of the diesel fuel filler neck. The stop means can be one or more flanged portions which seat against the top edge of the diesel fuel filler neck or a flanged rim around the upper end of the sleeve, where the flanged rim is configured to seat against the top edge of the diesel fuel filler neck.

The means near the upper end of the sleeve which provides for a snug fit of the sleeve against the internal wall surface of the diesel fuel filler neck may be one or more protrusion on an outside surface of the sleeve or an expanded upper end of the sleeve, where the outside dimension of the upper end of the sleeve requires some relative amount of pushing with one's fingers to secure the sleeve in place.

The gas nozzle blocking means for preventing the insertion of an unleaded gas fill nozzle into the sleeve comprises an elongate support structure fixed at its bottom end to the sleeve at a depth sufficient so as not to interfere with the insertion of a diesel fuel fill nozzle. The support structure projects vertically in an upward direction, similar to a phoenix configuration, and is spaced-apart from an internal wall surface of the sleeve so as to allow the insertion of the diesel fuel fill nozzle between the internal wall surface of the sleeve and the support structure. The upper end of the support structure has a blocking grid generally perpendicular to the support structure. The blocking grid perimeter is configured to allow the diesel nozzle to be inserted around the grid perimeter, and the diesel nozzle to be further inserted between the support structure and the internal wall surface of the filler neck. The blocking grid and/or sleeve may be positioned parallel to the upper edge of the filler neck, slightly just below the upper edge of the filler neck, or may extend vertically past the upper edge of the filler neck to a position just below the bottom edge of the cap when secured in place.

The blocking grid forms a screen or grate-like or mesh-like barrier with through holes. Preferably to minimize any hindrance of the flow of fuel, it is recommended that it be shaped in any one of the following forms or shapes: X-shaped, figure 8 shaped, half-moon shaped, half-moon shaped with pie-shaped segments within said grid, and pie-shaped. Preferably each shape should be slightly off-center in the 9:00 o'clock to 3:00 o'clock half of the opening to account for the peg and vent hose configuration found in diesel gas nozzle guns.

The blocking grid is configured such that when the sleeve with its blocking grid is inserted into the diesel fuel filler neck, the sleeve is oriented such that the blocking grid will not interfere with the operation of the automatic shut off safety device in the diesel fuel fill nozzle.

The device also includes a diesel fuel filler neck cap. This cap has an internal bore through it, which aligns with the opening of the diesel fuel filler neck when engaged. The bore is sized to allow access of the diesel fuel fill nozzle through the cap into the sleeve. Closure cap means is included on the outside surface of the cap for environmentally securing the diesel fuel filler neck when not refueling. This can be a snap-on gasketed cap or a threaded gasketed cap, although it is preferred that the closure cap be tethered to the main diesel fuel filler neck cap itself using a lanyard or chain to prevent the inadvertent loss of the closure cap.

The diesel fuel filler neck cap preferably includes key locking means for preventing the removal of the cap and sleeve from the diesel fuel filler neck without authorization. This will allow the fleet owner or vehicle owner to safeguard the key separate from the vehicle, thereby preventing drivers from using the key to remove the cap and blocking means.

Although it is preferred that the sleeve and diesel fuel filler neck cap be in two separate pieces in order to facilitate the installation in vehicles where the filler neck centerline may not be co-axial with the constructive centerline of the vehicle body access opening to the filler neck and to provide maximum flexibility. Otherwise, one embodiment includes a one-piece assembly where the diesel fuel filler cap and the upper end of the sleeve is a unified assembly. That is, the upper end of the sleeve is attached to a bottom end of the cap to form an integrally combined cap and sleeve.

BRIEF DESCRIPTION OF THE DRAWINGS

In the accompanying drawings:

FIG. 2a is a cross-sectional view depicting conceptually one method of providing for a pressure tight or snug fit for the inner sleeve portion of the invention, that is, the sleeve is expanded on one end;

FIG. 2b is a cross-sectional view depicting conceptually another method of providing for a pressure tight or snug fit for the inner sleeve portion of the invention, where the sleeve is relatively tight along its total length but a flanged portion is added to prevent further insertion of the sleeve in the filler neck;

FIG. 2c is a cross-sectional view depicting conceptually another method of providing for a pressure tight or snug fit for the inner sleeve portion of the invention, where the sleeve is relatively tight along its total length but one or more ridged protrusion are added for extra tight engagement with the upper end inner wall of the filler neck and to prevent further insertion of the sleeve in the filler neck;

FIG. 2d is an exploded view of one of the ridged protrusions of FIG. 2c;

DETAILED DESCRIPTION OF THE INVENTION

Figure 1:
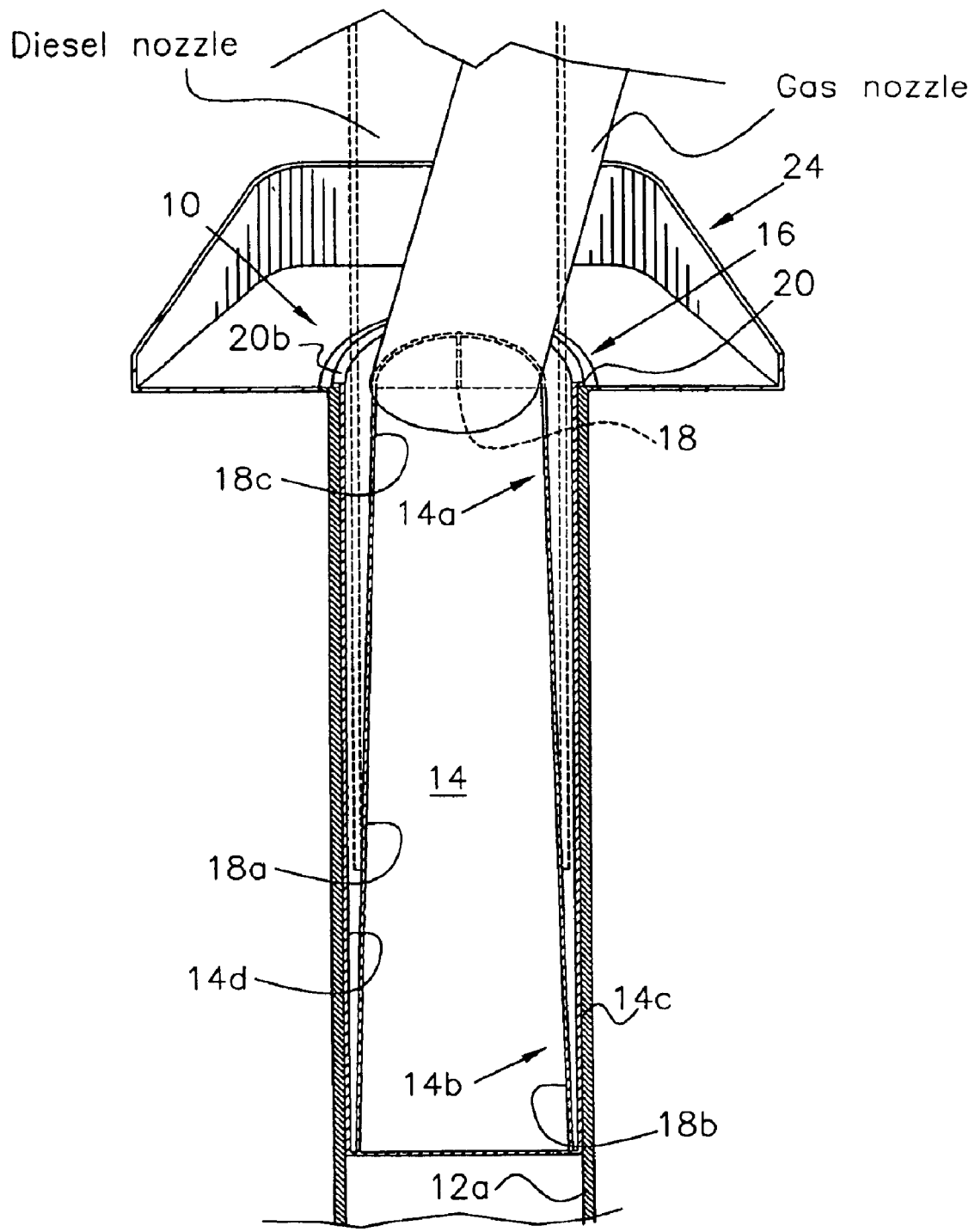
FIG. 1 is a cross-sectional conceptual view of one embodiment of the present invention depicting in broken lines for representational purposes, a diesel nozzle and depicted in a single solid line, an unleaded gas nozzle, the diesel nozzle being larger in diameter than the unleaded gas nozzle.
Figure 2E:
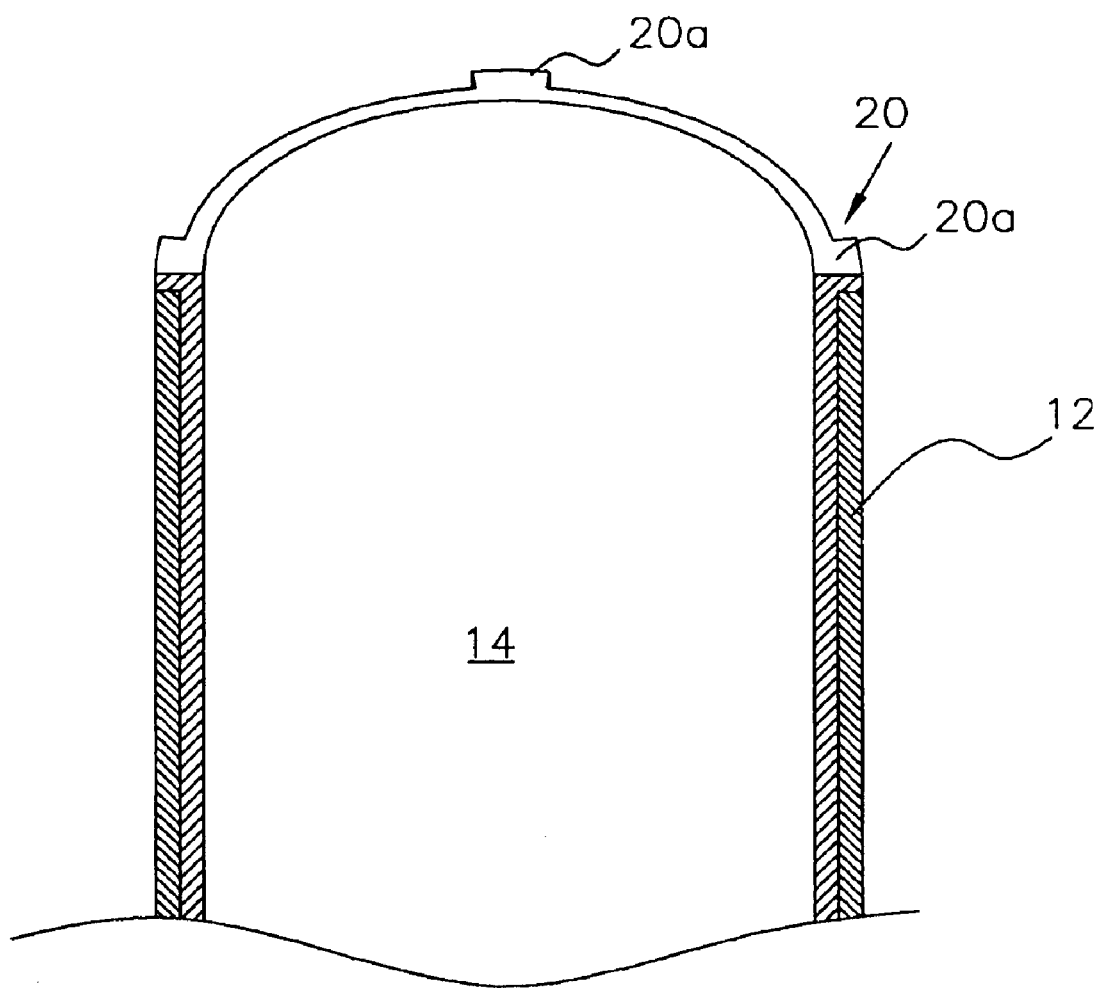
FIG. 2e is a cross-sectional view depicting conceptually another method of providing for a pressure tight or snug fit for the inner sleeve portion of the invention, where the sleeve is relatively tight along its total length but a flanged portion, in the form of two or more flanged tabs, is added to prevent further insertion of the sleeve in the filler neck.

Referring now to the drawings, FIG. 1 partially discloses one embodiment of the present invention, which is a device for preventing entry of an unleaded gas fill nozzle in a diesel fuel filler neck and is depicted generally as 10.

As viewed in the conceptual depictions of FIGS. 1, 2a–2e, 3–4 and 5a–5e, the invention is a device 10 for preventing entry of an unleaded gas fill nozzle in a diesel fuel filler neck 12. It is includes an elongate sleeve 14 having an upper end 14a and a lower end 14b and configured to be inserted inside the diesel fuel filler neck 12. The sleeve 14 has means 16 near its upper end 14a for providing a generally snug or friction pressure fit against the internal wall surface 12a of the diesel fuel filler neck 12 when the sleeve 14 is pushed into diesel fuel filler neck 12.

The invention 10 also includes unleaded gas nozzle blocking means 18 for preventing the insertion of an unleaded gas fill nozzle into the sleeve 18.

The upper end 14a of the sleeve 14 may also include stop means 20 for preventing the insertion of the upper end 14a of the sleeve 14 beyond the top edge of the diesel fuel filler neck 12. The stop means 20 can be one or more flanged portions (20a) which seat against the top edge of the diesel fuel filler neck or a flanged rim 20b around the upper end 14a of the sleeve 14, where the flanged rim 20b is configured to seat against the top edge or surface 24 of the diesel fuel filler neck 12. This top edge 24 is sometime part of a floor of a chamber that extends vertically with means for engaging a gas cap. For example, the flanged portions 20a may be a bent arc-shaped edge or tabs 20a along the upper edge of the sleeve 14, possibly ⅛ inch wide and ⅛–¼ inch in length, while the flanged rim 20b may be a bent edge forming a ring about ⅛ inch in width. See FIGS. 1 and 2b for the ring flange shape and FIG. 2e for the tabs version.

The means 16 near the upper end 14a of the sleeve 14, which provides for a snug fit of the sleeve 14 against the internal wall surface 12a of the diesel fuel filler neck 12 may be one or more protrusions 16a (see FIGS. 2c and 2d) on an outside surface 14c of the sleeve 14 or an expanded upper end 16b of the sleeve 14 as shown in an exaggerated manner in FIG. 2a, where the outside dimension of the upper end 14a of the sleeve 14 requires some relative amount of pushing with one's fingers to secure the sleeve 14 in place. In essence, the sleeve 14 must be inserted tight enough to prevent its spinning out of position or rotating so as to interfere with the automatic safety devices. By snug fit, it is meant that the sleeve 14 is configured and fitted so that it is not free-floating and will not rotate by itself in the filler neck, without some deliberate effort to rotate the sleeve 14.

It is also anticipated that sleeve 14 and/or blocking means 18 may extend upwardly so as to be positioned generally parallel to the upper edge of the filler neck 12, slightly just below the upper edge of the filler neck 12, or may actually extend vertically past the upper edge of the filler neck 12 to a position just below the bottom edge 22e of the cap 22 when secured in place.

The gas nozzle blocking means 18 for preventing the insertion of an unleaded gas fill nozzle into the sleeve 14 comprises an elongate support structure 18a fixed at its bottom end 18b to the sleeve 14 at a depth sufficient so as not to interfere with the insertion of a diesel fuel fill nozzle (see FIG. 1). The attachment of the bottom end 18b of the elongate support structure 18a is designed to provide for minimal blockage or interference of the flow of fuel through the device 10 and into the diesel fuel filler neck. The support structure 18a projects vertically toward the upper end 14a of the sleeve 14 and is spaced-apart from an internal wall surface 14d of the sleeve 14 so as to allow the insertion of the diesel fuel fill nozzle between the internal wall surface 14d of the sleeve 14 and the support structure 18a. The upper end 18c of the support structure 18a has a blocking grid 18d, which is generally perpendicular to the support structure 18a. The blocking grid perimeter 18e is configured to allow the diesel fuel nozzle to be placed over and around the grid 18d and further lowered into the sleeve and in the space or gap formed by the spaced-apart relationship of the support structure 18a and the internal wall surface 14d of the sleeve 14.

The blocking grid 18d forms a screen or grate-like or mesh-like barrier with formed through holes 18f. Preferably, to minimize any hindrance of the flow of fuel, it is recommended that it be shaped in any one of the following forms or shapes: X-shaped, figure 8 shaped, half-moon shaped, half-moon shaped with pie-shaped segments within said grid, and pie-shaped, as shown in FIGS. 5a–5e. As previously mentioned, it is also preferred that the grid shapes be off-centered to allow for the peg and vent hose assembly in diesel gas nozzle guns.

The blocking grid 18d is configured such that when the sleeve 14 with its blocking grid 18d is inserted into the diesel fuel filler neck 12, the sleeve 14 is oriented such that the blocking grid 18d will not interfere with the operation of the automatic shut off safety device (not shown in the drawings) in the diesel fuel fill nozzle.

Figure 3:
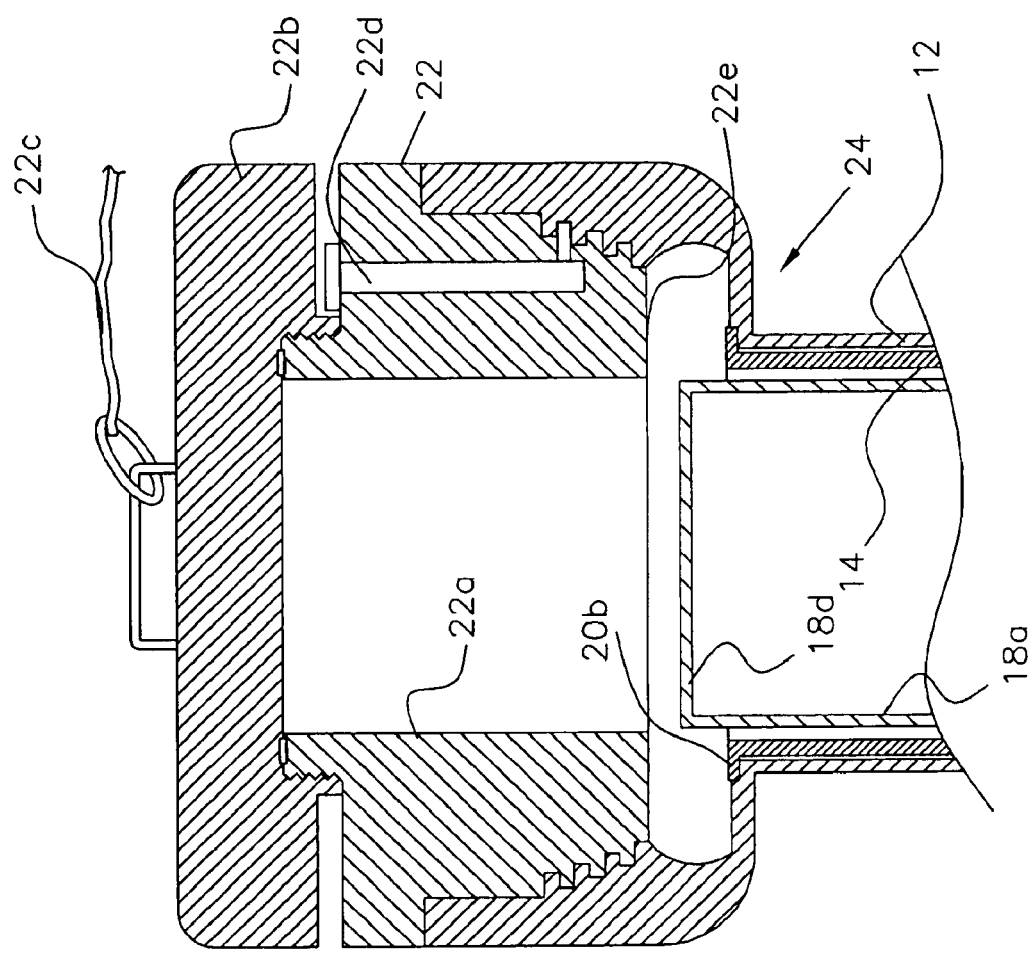
FIG. 3 is a conceptual cross-sectional view of an embodiment of the invention where a cap assembly is included and the sleeve and blocking screen or grid assembly is separately inserted in the filler neck.
Figure 4:
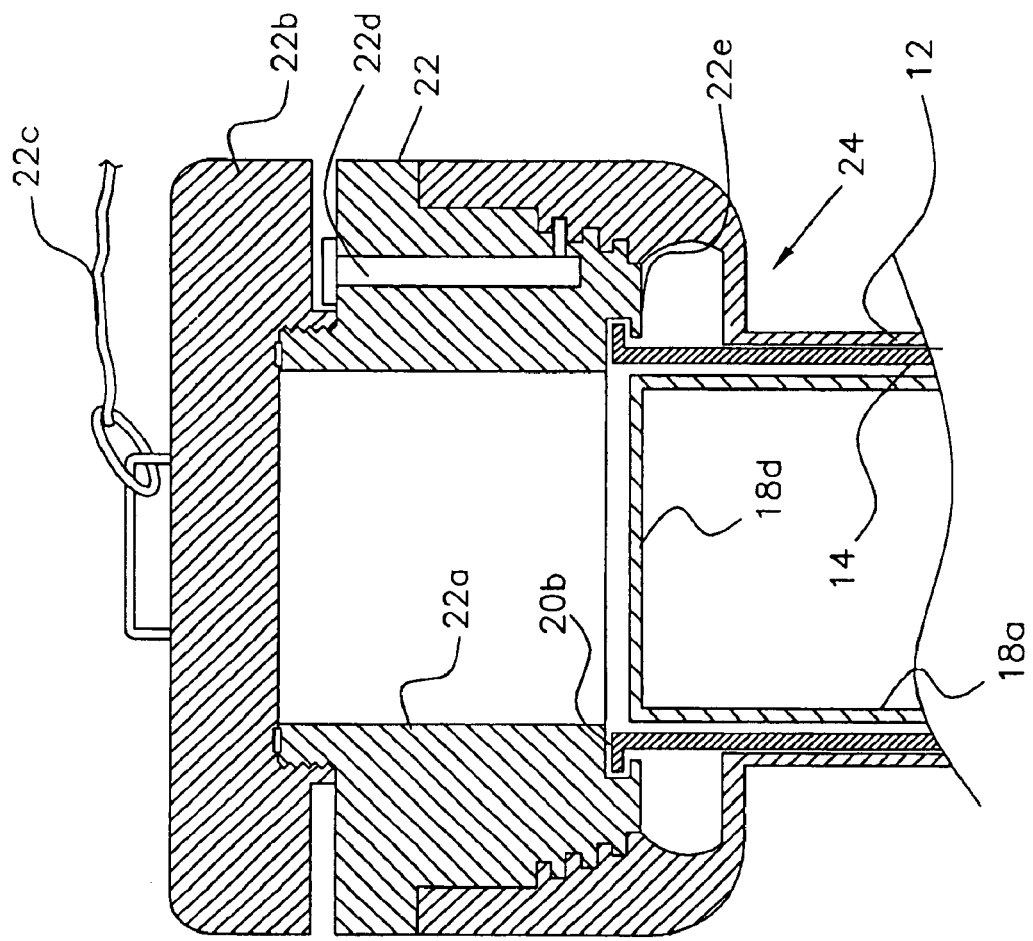
FIG. 4 is a conceptual cross-sectional view of another embodiment of the invention where a cap assembly is included and the sleeve and blocking screen or grid assembly is integral to the cap and inserted as a unit in the filler neck.
Figure 5A:
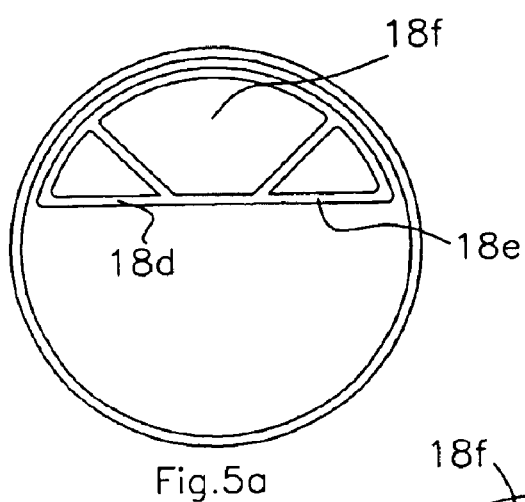
FIGS. 5a–5e are conceptual depictions of possible blocking grid or screen configurations that can be formed to prevent the unleaded gas nozzle from entering the filler neck of a diesel gas powered vehicle.
Figure 5B:
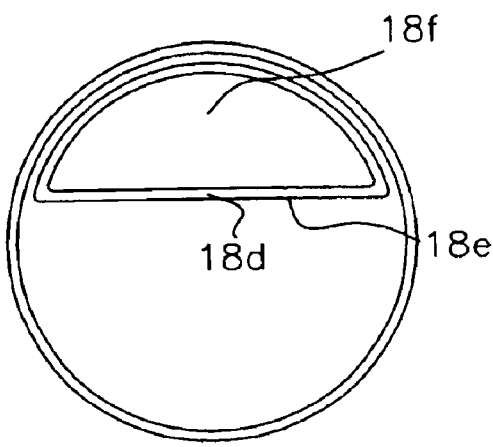
Figure 5C:
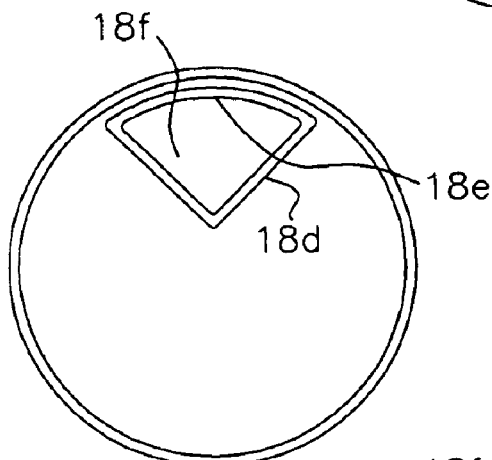
Figure 5D:
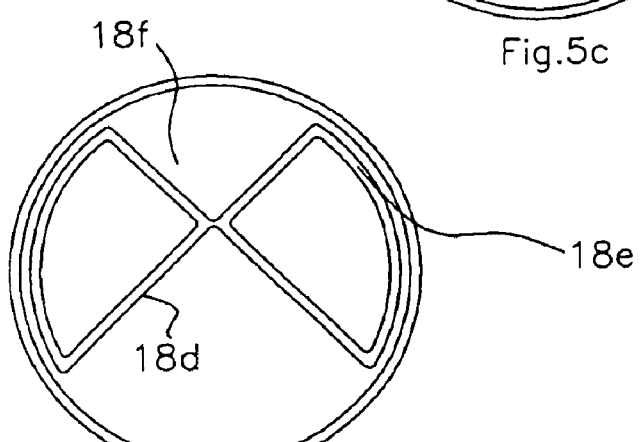
Figure 5E:
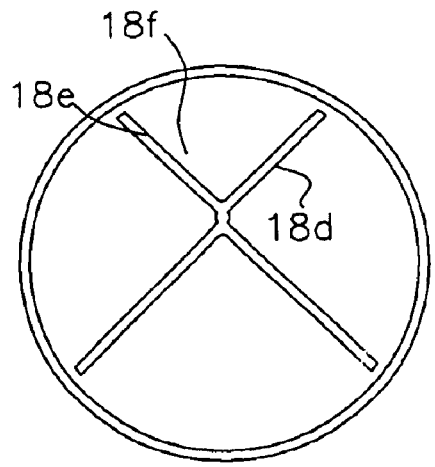

As shown in FIGS. 3 and 4, the invention 10 also includes a diesel fuel filler neck cap 22. This cap 22 has an internal bore 22a through it, which aligns with the opening of the diesel fuel filler neck 12 when engaged. The bore 22a is sized to allow access of the diesel fuel fill nozzle through the cap 22 into the sleeve 14. Closure cap means (or hereinafter referred to as closure cap) 22b is included on the top surface of the cap for environmentally securing the diesel fuel filler neck 12 when not refueling, thereby preventing contaminants from entering the bore 22a into the diesel fuel filler neck 12. This can be a snap-on gasketed closure cap, a cap engagement device such as those used on automobile radiator caps, or a threaded gasketed closure cap 22b as shown in FIGS. 3 and 4. In addition, it is desirable that the closure cap 22b be tethered to the main diesel fuel filler neck cap 22 itself using a lanyard or chain 22c to prevent the inadvertent loss of the closure cap 22b.

The diesel fuel filler neck cap 22 preferably includes key locking means 22d for preventing the removal of the filler neck cap 22 and sleeve 14 from the diesel fuel filler neck 12 without authorization. As mentioned above, a fleet owner or vehicle owner can keep the key separate from the vehicle to prevent drivers from tampering with the inventive restrictor.

It is preferred that the sleeve 14 and diesel fuel filler neck cap 22 be in two separate pieces in order to facilitate the installation in vehicles where the filler neck centerline may not be co-axial with the constructive centerline of the vehicle body access opening to the filler neck 12 and to provide maximum flexibility, as conceptually depicted in FIG. 3. Otherwise, one embodiment includes a one-piece assembly where the diesel fuel filler cap 22 and the upper end 14a of the sleeve 14 are a unified assembly, as conceptually depicted in FIG. 4. That is, the upper end 14a of the sleeve 14 is attached to a bottom end 22e of the cap 22 to form an integrally combined cap 22 and sleeve 14. FIG. 4 depicts one example of such an integral assembly where the flanged rim 20b is fixed inside a groove in the cap. Adhesive or welding are other examples of methods known in the art to join two bodies such as the sleeve and cap as a unified body.

The cap 22, including the closure cap 22b, is typically made from composite polymeric materials, metallic materials or combinations of polymeric and metallic materials, while gasketed material is typically elastomeric or compositions of polymeric and elastomeric materials. It is anticipated that the sleeve 14 and blocking means 18 be made from a stainless steel material, aluminum material, a plated steel material (such as a zinc plated steel), a brass or bronze material, a polymeric composite material, and/or combinations of such materials, or any material suitable for such use, as long as the material is resistant to exposure to diesel fuel.

The automatic safety devices referred to above are generally located at a 6:00 o'clock position when facing the vehicle so it preferable that the blocking grids 18d described above be installed so that the configuration or shape chosen extends generally between an approximate 9:00 o'clock position and an approximate 3:00 o'clock position and away from the 6:00 o'clock position, that is, the grid 18d should in essence, be predominantly closer to the 12:00 o'clock position. The grid 18d should be relatively small to allow space for the easy insertion of the diesel fuel fill nozzle over it, but large enough to prevent the insertion of an unleaded gas fill nozzle over it. Each of the shapes shown in FIGS. 5a–5e are intended to be general shapes that resemble such configurations and is not limited to an exact representation as depicted. Further, when reference is made to half-moon shape, that can encompass a crescent moon shape as well.

It should be understood that the preceding is merely a detailed description of one or more embodiments of this invention and that numerous changes to the disclosed embodiments can be made in accordance with the disclosure herein without departing from the spirit and scope of the invention. The preceding description, therefore, is not meant to limit the scope of the invention. Rather, the scope of the invention is to be determined only by the appended claims and their equivalents.

What is claimed is:

1. A device for preventing entry of an unleaded gas fill nozzle in a diesel fuel filler neck comprising:
    an elongate sleeve having an upper end and a lower end and configured to be inserted inside the diesel fuel filler neck, the sleeve having means near its upper end for providing a snug fit against the internal wall surface of the diesel fuel filler neck when the sleeve is pushed into diesel fuel filler neck; and
    gas nozzle blocking means for preventing the insertion of an unleaded gas fill nozzle into the sleeve,
    wherein the means near the upper end of the sleeve for providing the snug fit of the sleeve against the internal wall surface of the diesel fuel filler neck is one or more protrusions on an outside surface of the sleeve.

2. The device according to claim 1, wherein the upper end of the sleeve further comprises:
    stop means for preventing the insertion of the upper end of the sleeve beyond the top edge of the diesel fuel filler neck.

3. A device for preventing entry of an unleaded gas fill nozzle in a diesel fuel filler neck comprising:
    an elongate sleeve having an upper end and a lower end and configured to be inserted inside the diesel fuel filler neck, the sleeve having means near its upper end for providing a snug fit against the internal wall surface of the diesel fuel filler neck when the sleeve is pushed into diesel fuel filler neck; and
    gas nozzle blocking means for preventing the insertion of an unleaded gas fill nozzle into the sleeve, wherein the gas nozzle blocking means for preventing the insertion of an unleaded gas fill nozzle into the sleeve comprises:
    an elongate support structure fixed at its bottom end to the sleeve at a depth sufficient so as not to interfere with the insertion of a diesel fuel fill nozzle, the support structure projecting vertically upward and spaced-apart from an internal wall surface of the sleeve so as to allow the insertion of the diesel fuel fill nozzle between the internal wall surface of the sleeve and the support structure; and
    the upper end of the support structure having blocking grid generally perpendicular to the support structure, the blocking grid perimeter also being configured to allow insertion of the diesel fuel fill nozzle around its perimeter and further lowered between the internal wall surface of the sleeve and the support structure.

4. The device according to claim 3, wherein the blocking grid is one of:
    generally X-shaped;
    generally figure 8 shaped;
    generally half-moon shaped;
    generally half-moon shaped with pie-shaped segments within said grid; and
    generally pie-shaped.

5. The device according to claim 3, wherein the blocking grid is configured such that when the sleeve is inserted into the diesel fuel filler neck, the sleeve is oriented such that the blocking grid will not interfere with the operation of the automatic shut off safety device in the diesel fuel fill nozzle.

6. A device for preventing entry of an unleaded gas fill nozzle in a diesel fuel filler neck comprising:
    an elongate sleeve having an upper end and a lower end and configured to be inserted inside the diesel fuel filler neck, the sleeve having means near its upper end for providing a snug fit against the internal wall surface of the diesel fuel filler neck when the sleeve is pushed into diesel fuel filler neck;

gas nozzle blocking means for preventing the insertion of an unleaded gas fill nozzle into the sleeve;

a diesel fuel filler neck cap; and the cap further comprising an internal bore through said cap, said bore aligning with the opening of the diesel fuel filler neck when engaged, and said bore further being sized to allow access of the diesel fuel fill nozzle through the cap into the sleeve, and closure cap means on the top surface of the cap for environmentally securing the diesel fuel filler neck, thereby preventing the entry of contaminants into said bore and said sleeve when not refueling.

7. The device according to claim 6, further comprising:
key locking means for preventing the removal of the cap and sleeve from the diesel fuel filler neck without authorization.

8. The device according to claim 6, wherein the upper end of the sleeve is attached to a bottom end of the cap to form an integrally combined cap and sleeve.

9. The device according to claim 6, wherein the closure cap means is tethered to the cap.

10. A device for preventing entry of an unleaded gas fill nozzle in a diesel fuel filler neck comprising:

a diesel fuel filler neck cap;

an internal bore through said cap, said bore aligning with the opening of the diesel fuel filler neck when engaged, and said bore further being sized to allow access of the diesel fuel fill nozzle through the cap into the diesel fuel filler neck;

closure cap means on the top surface of the cap for environmentally securing the diesel fuel filler neck, thereby preventing the entry of contaminants into said bore and said diesel fuel filler neck when not refueling;

key locking means for preventing the removal of the cap from the diesel fuel filler neck without authorization;

the closure cap means being tethered to the cap; and gas nozzle blocking means for preventing the insertion of an unleaded gas fill nozzle into the diesel fuel filler neck.

11. The device according to claim 10, further comprising:
an elongate sleeve having an upper end and a lower end and configured to be inserted inside the diesel fuel filler neck, the sleeve having means near its upper end for providing a snug fit against the internal wall surface of the diesel fuel filler neck when the sleeve is pushed into diesel fuel filler neck.

12. The device according to claim 11, wherein the upper end of the sleeve further comprises:

stop means for preventing the insertion of the upper end of the sleeve beyond the top edge of the diesel fuel filler neck.

13. The device according to claim 12, wherein the stop means is one or more flanged portions, which seat against the top edge of the diesel fuel filler neck.

14. The device according to claim 12, wherein the stop means is a flanged rim around the upper end of the sleeve, the flanged rim be configured to seat against the top edge of the diesel fuel filler neck.

15. The device according to claim 11, wherein the means near the upper end of the sleeve for providing the snug fit of the sleeve against the internal wall surface of the diesel fuel filler neck is one or more protrusions on an outside surface of the sleeve.

16. The device according to claim 11, wherein the means near the upper end of the sleeve for providing the snug fit of the sleeve against the internal wall surface of the diesel fuel filler neck is an expanded upper end of the sleeve.

17. The device according to claim 11, wherein the gas nozzle blocking means comprises:

an elongate support structure fixed at its bottom end to the sleeve at a depth sufficient so as not to interfere with the insertion of a diesel fuel fill nozzle, the support structure projecting vertically upward and spaced-apart from an internal wall surface of the sleeve so as to allow the insertion of the diesel fuel fill nozzle between the internal wall surface of the sleeve and the support structure; and the upper end of the support structure having blocking grid generally perpendicular to the support structure, the blocking grid perimeter also being configured to allow insertion of the diesel fuel fill nozzle around its perimeter and further lowered between the internal wall surface of the sleeve and the support structure.

18. The device according to claim 17, wherein the blocking grid is one of:

generally X-shaped;

generally figure 8 shaped;

generally half-moon shaped;

generally half-moon shaped with pie-shaped segments within said grid; and generally pie-shaped.

19. The device according to claim 17, wherein the blocking grid is configured such that when the sleeve is inserted into the diesel fuel filler neck, the sleeve is oriented such that the blocking grid will not interfere with the operation of the automatic shut off safety device in the diesel fuel fill nozzle.

20. The device according to claim 18, wherein the upper end of the sleeve is attached to a bottom end of the cap to form an integrally combined cap and sleeve.

* * * * *